(12) United States Patent
Sugatani et al.

(10) Patent No.: US 10,605,453 B2
(45) Date of Patent: Mar. 31, 2020

(54) CONDUIT AND HOT WATER SUPPLY SYSTEM

(71) Applicants: NORITZ CORPORATION, Kobe-shi (JP); LIVING ENGINEERING CO., LTD., Minato-ku (JP); MIRAI INDUSTRY CO., LTD., Anpachi-gun (JP)

(72) Inventors: Masaki Sugatani, Kobe (JP); Takanori Nagano, Kobe (JP); Hironao Matsunaga, Kobe (JP); Takahide Hasegawa, Kobe (JP); Yasuhide Sato, Minato-ku (JP); Kiyomi Kanamoto, Minato-ku (JP); Hirokazu Kawamura, Anpachi-gun (JP); Shohei Matsuda, Anpachi-gun (JP)

(73) Assignees: NORITZ CORPORATION, Kobe-Shi (JP); TOKYO GAS LIVING ENGINEERING CO., LTD., Tokyo (JP); MIRAI INDUSTRY CO., LTD., Anpachi-gun (JP)

(*) Notice: Subject to any disclaimer, the term of this patent is extended or adjusted under 35 U.S.C. 154(b) by 518 days.

(21) Appl. No.: 15/413,552

(22) Filed: Jan. 24, 2017

(65) Prior Publication Data
US 2018/0209645 A1    Jul. 26, 2018

(51) Int. Cl.
*F23J 13/02* (2006.01)
*F23J 11/00* (2006.01)
(Continued)

(52) U.S. Cl.
CPC ............ *F23J 13/02* (2013.01); *F16L 11/11* (2013.01); *F23J 11/00* (2013.01); *F16L 11/121* (2013.01)

(58) Field of Classification Search
CPC ... F23J 13/02; F23J 13/025; F23J 11/00; F23J 13/04; F16L 11/11; F16L 11/121
(Continued)

(56) References Cited

U.S. PATENT DOCUMENTS 2,073,335 A * 3/1937 Connell ................ A61M 16/08
                                                128/204.18
2,707,491 A * 5/1955 Harris ................... B29D 23/001
                                                138/133
(Continued)

FOREIGN PATENT DOCUMENTS

EP    1227277 A2 *  7/2002 ............... F23J 13/02
GB    1092150 A  * 11/1967 ............. B29C 53/30

*Primary Examiner* — Steven B McAllister
*Assistant Examiner* — Frances F. Hamilton
(74) *Attorney, Agent, or Firm* — Shumaker, Loop & Kendrick, LLP (57) ABSTRACT

A conduit made of a synthetic resin, having an inner surface and an outer surface, having concave portions and convex portions alternately and continuously provided in the length direction. The conduit is bendable. The conduit includes outer wall parts extending with a first width in the length direction; inner wall parts positioned radially inside relative to the outer wall parts and extending with a second width in the length direction; and side wall parts joining the outer wall parts and the inner wall parts so that the outer wall parts and the inner wall parts are alternately and continuously provided in the length direction. The outer surfaces of the outer wall parts each have, at both ends in the length direction, protruding parts, which protrude in the radial direction.

9 Claims, 9 Drawing Sheets

(51) Int. Cl.
*F16L 11/11* (2006.01)
*F16L 11/12* (2006.01)

(58) Field of Classification Search
USPC .................................. 138/121, 122; 126/312
See application file for complete search history.

(56) References Cited

U.S. PATENT DOCUMENTS

| | | | | |
|---|---|---|---|---|
| 3,273,600 A * | 9/1966 | Swan | ...................... | F16L 11/16 138/122 |
| 4,310,946 A * | 1/1982 | Baker | ...................... | A47L 9/24 138/122 |
| 4,420,019 A * | 12/1983 | Dillon | ...................... | A47L 9/24 138/129 |
| 4,589,448 A * | 5/1986 | del Valle | ................. | F16L 11/16 138/122 |
| 4,712,515 A * | 12/1987 | Couprie | ................. | F23J 13/025 122/1 A |
| 4,860,797 A * | 8/1989 | Richards | ................. | F16L 11/16 138/122 |
| 5,165,732 A * | 11/1992 | Townsend | ............. | F16L 13/163 126/307 R |
| 5,329,973 A * | 7/1994 | Kanao | ...................... | F16L 9/16 138/122 |
| 5,343,738 A * | 9/1994 | Skaggs | ................. | F16L 11/121 138/113 |
| 5,456,291 A * | 10/1995 | Kunzmann | ......... | F01N 13/1816 138/103 |
| 5,660,912 A * | 8/1997 | Menzel | ..................... | F16L 1/00 138/122 |
| 6,062,608 A * | 5/2000 | Gerth | ..................... | F16L 39/005 285/123.15 |
| 6,076,862 A * | 6/2000 | Barth | ..................... | F16L 39/005 138/148 |
| 6,234,163 B1 * | 5/2001 | Garrod | ..................... | F16L 11/20 126/307 R |
| 6,634,352 B2 * | 10/2003 | Maiello | ..................... | F23J 13/04 126/307 R |
| 6,830,076 B1 * | 12/2004 | Patel | ....................... | F16L 31/00 138/110 |
| 7,798,891 B2 * | 9/2010 | Stubbert | ................... | F23J 13/02 126/312 |
| 8,689,837 B1 * | 4/2014 | Smith | ..................... | E04D 13/08 137/615 |
| 8,776,836 B2 * | 7/2014 | Ragner | ................... | F16L 11/118 138/119 |
| 8,881,689 B2 * | 11/2014 | Kameyama | ............... | F24H 1/28 122/19.2 |
| 9,140,450 B2 * | 9/2015 | Jacklich | ................. | F23J 13/025 |
| 9,239,121 B1 * | 1/2016 | Ragner | ..................... | F16L 11/00 |
| 9,371,944 B2 * | 6/2016 | Ragner | ................... | F16L 11/118 |
| 10,309,560 B2 * | 6/2019 | Ragner | ................... | F16L 11/118 |
| 2005/0229923 A1 * | 10/2005 | Barry | ..................... | F23J 13/025 126/312 |
| 2007/0141284 A1 * | 6/2007 | Carpenter | ................ | F16L 11/11 428/36.1 |
| 2010/0154914 A1 * | 6/2010 | Liebson | ................. | D06F 58/20 138/122 |
| 2012/0255329 A1 * | 10/2012 | Wanweerakul | ....... | D06F 39/083 68/208 |
| 2014/0130929 A1 * | 5/2014 | Elliott | ..................... | F16L 11/111 138/121 |
| 2014/0209087 A1 * | 7/2014 | Bertler | ..................... | F23J 13/02 126/307 R |
| 2014/0273703 A1 * | 9/2014 | Mower | ..................... | A61L 27/16 442/351 |
| 2015/0330535 A1 * | 11/2015 | Subacchi | ................. | F16L 9/08 138/122 |
| 2015/0345671 A1 * | 12/2015 | Werner | ............. | A61M 16/0875 128/204.18 |
| 2016/0060873 A1 | 3/2016 | Sugatani | | |

\* cited by examiner

CONDUIT AND HOT WATER SUPPLY SYSTEM

TECHNICAL FIELD

The present invention relates to a conduit connected to equipment and the like to carry a gas, and a hot water supply system in which the conduit is laid.

BACKGROUND

A long and flexible conduit made of a synthetic resin is typically connected to an exhaust port of a water heater in order to guide high-temperature gas discharged from the exhaust port of the water heater (arranged inside a building) to the outdoors. Conventional corrugated conduits made of a synthetic resin are formed in a bellows shape having concave portions and convex portions alternately and continuously provided in the length direction, and are freely bendable. Such conduits made of a synthetic resin are formed, for example, through a vacuum molding or blow molding process, and have flexibility and lightweight properties.

An exemplary hot water supply system is disclosed in US2016/60873A1. In particular, one end of a conduit is connected to an exhaust port of a water heater. The conduit extends indoors and is laid in a bent state. A building is provided with an air diffusion part (diffuser) penetrating its outer wall or roof and communicating with the exterior. The other end of the conduit is connected to this air diffusion part. The conduit laid so as to be bent indoors carries an exhaust gas from the water heater, guides the exhaust gas to the air diffusion part and releases the exhaust gas via the air diffusion part to the outside air. An outer tube for protecting the conduit is laid between the air diffusion part and the water heater so as to insert the conduit therein. In general, the outer tube is composed of a plurality of straight metallic cylinders including an aluminum alloy, steel or the like. The plurality of straight metallic cylinders are joined by means of a screw so that the outer tube is bent along the route of the conduit. The screw penetrates the metallic cylinders so that the head of the screw is positioned on the outer surface side of the metallic cylinders. As a result, a sharp tip end of the screw protrudes inward from the inner surfaces of the metallic cylinders.

The hot water supply system is constructed in such a manner that an outer tube, which is bent, is laid between the water heater and the diffuser and that the conduit is inserted into the outer tube. The conduit is introduced inside through an opening at one end of the outer tube. When the conduit passes through the inside of the outer tube, the tip end of the screw protruding on the inner surface of the outer tube can abut against the outer surface of the conduit. The outer surface of the conduit is easily damaged due to such contact between the outer surface of the conduit and the screw. Especially, the edges of the convex portions of the conduit are damaged by the sharp tip end of the screw so that a hole is easily formed in the conduit. The presence of the hole causes disadvantageous leakage of a gas from the conduit to the outside, or when a hole is found in the conduit, the conduit must be replaced with a new one. In order to solve the above problem, the present invention provides a conduit having high resistance to scratching by a screw.

SUMMARY

The conduit according to one embodiment of the present invention is a conduit made of a synthetic resin, having an inner surface and an outer surface, having concave portions and convex portions alternately and continuously provided in a length direction. In this aspect, the conduit is bendable. The conduit includes outer wall parts extending with a first width in the length direction; inner wall parts positioned radially inside relative to the outer wall parts and extending with a second width in the length direction; and side wall parts joining the outer wall parts and the inner wall parts so that the outer wall parts and the inner wall parts are alternately and continuously provided/arranged on the conduit in a length direction of the conduit. In certain aspects, the outer wall parts each have, at both ends in the length direction, protruding parts which protrude from the outer surface in a radial direction.

In the conduit according to one embodiment of the present invention, the outer wall parts each include, on their outer surface, protruding parts which protrude in the radial direction at both ends in the length direction. In other words, the outer wall parts have thick wall parts at both edges in the length direction. Therefore, even when both edges of the outer wall part of the conduit are brought in contact with the tip end of the screw when the conduit is introduced into the outer tube into which the screw protrudes, the formation of a hole in the conduit is suppressed because the wall parts near the edges are thick. Also, when the conduit is sent into the outer tube, the inner surface of the outer tube and the protruding parts of the conduit are brought in contact with each other. Since the contact area between the conduit and the outer tube becomes relatively small in this manner, the resistance generated when the conduit is sent into the outer tube is reduced.

In conduits according to some embodiments of the present invention, the inner wall parts may each have a ridged part on their outer surface. The ridged part reduces the substantial depth of the concave portion. As a result, the screw is prevented from entering and being caught in the concave portion. Also, the ridged part may have a longitudinal section having an approximately trapezoidal shape tapered radially outward. Further, the ridged part may be formed adjacent to the side wall parts so as not to form, between the ridged part and the side wall parts, a gap in which the tip end of the screw is caught. The second width of the inner wall parts may be greater than the first width of the outer wall parts so as to prevent the tip end of the screw from being caught between the adjacent side wall parts.

In conduits according to some embodiments of the present invention, $h_1$ is defined as a height up to the side wall part, $h_2$ is defined as a height of the protruding part, $h_3$ is defined as a height of the ridged part, and t is defined as a thickness in a center of the outer wall part. $(h_1-t)$ may be about 2.2 mm or less. Due to this, the conduit can have appropriate flexibility. Also $(h_1+h_2-h_3)$ may be about 2.3 mm or less. Due to this, when the screw which protrudes about 10 mm inward in the outer tube scratches the outer surface of the conduit, the screw is suppressed from being caught in the concave portion. Further $h_2$ may be 0.1 mm or more. Due to this, the thickness at both edges of the outer wall part is increased, thereby increasing the resistance of the conduit to scratching by the screw.

Other characteristics and aspects of the present invention will be elucidated from the following detailed description concerning the characteristics in accordance with various Examples in conjunction with the attached drawings for purposes of illustration.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

DETAILED DESCRIPTION

Disclosed is a conduit 100 that is laid indoors, and used for guiding an exhaust gas discharged from a water heater 11 arranged indoors to the outdoors. The conduit 100 is laid, so as to be bent, from the water heater 11 to an air diffusion part 13.

Figure 1:
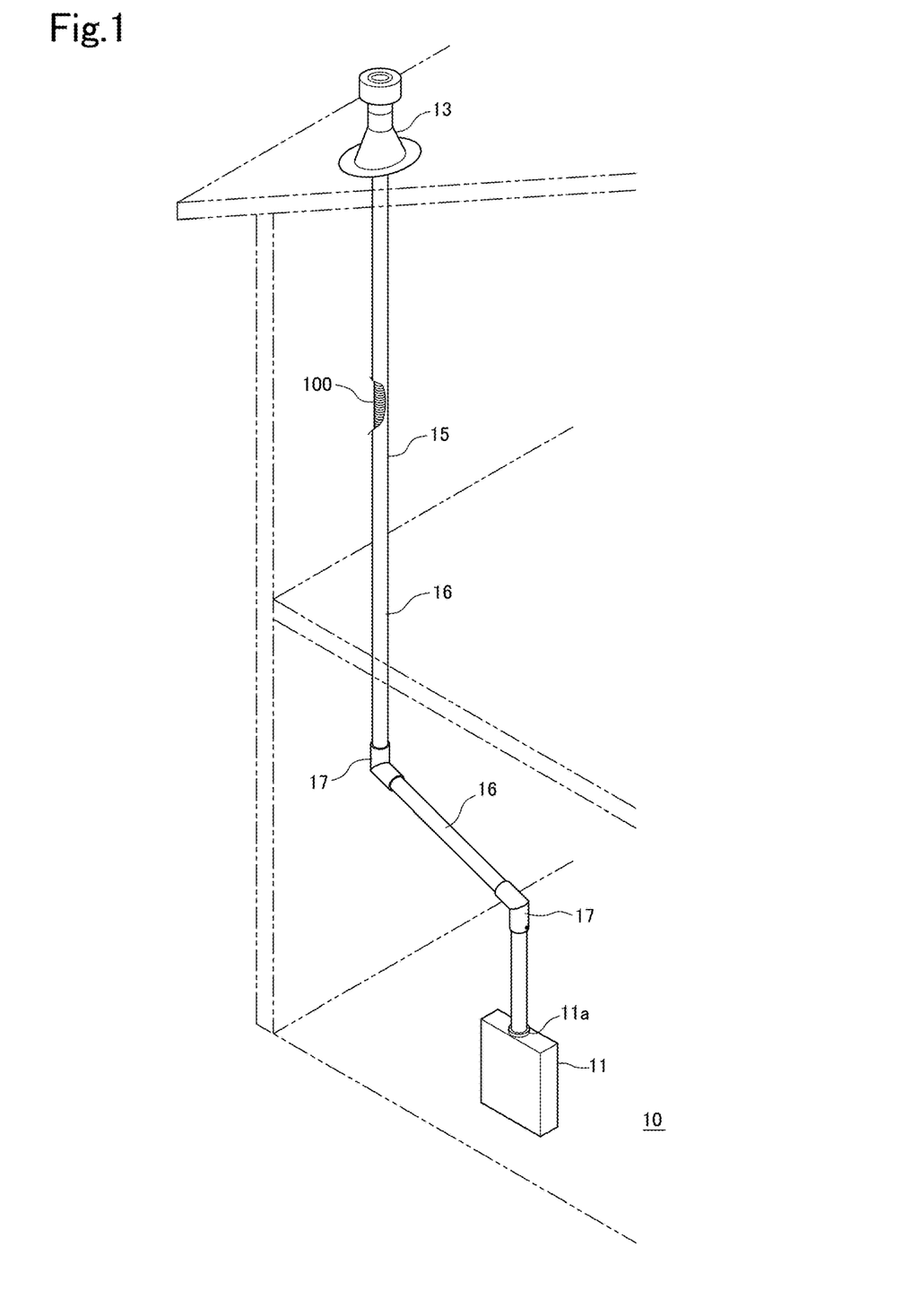
FIG. 1 is a schematic diagram of a hot water supply system according to one embodiment of the present invention.

FIG. 1 is a schematic diagram of a hot water supply system 10. As shown in FIG. 1, the hot water supply system 10 is constructed inside a building. The hot water supply system 10 includes a water heater 11 installed on a floor of the building; an air diffusion part 13 for exhausting a gas to the outdoors; an outer tube 15 laid between the water heater 11 and the air diffusion part 13; and a conduit 100 connected to the water heater 11 and the air diffusion part 13 inside the outer tube 15. In the hot water supply system 10, one end of the conduit 100 is connected to an exhaust port 11a of the water heater 11. The other end of the conduit 100 is connected to the air diffusion part 13 formed in a chimney on a roof. The outer tube 15 and the conduit 100 are laid in a bent state indoors. In brief, in the hot water supply system 10, a high-temperature exhaust gas from the water heater 11 is discharged via the conduit 100 to the outdoors. Also, the outer tube 15 covers and protects the conduit 100.

Figure 2:
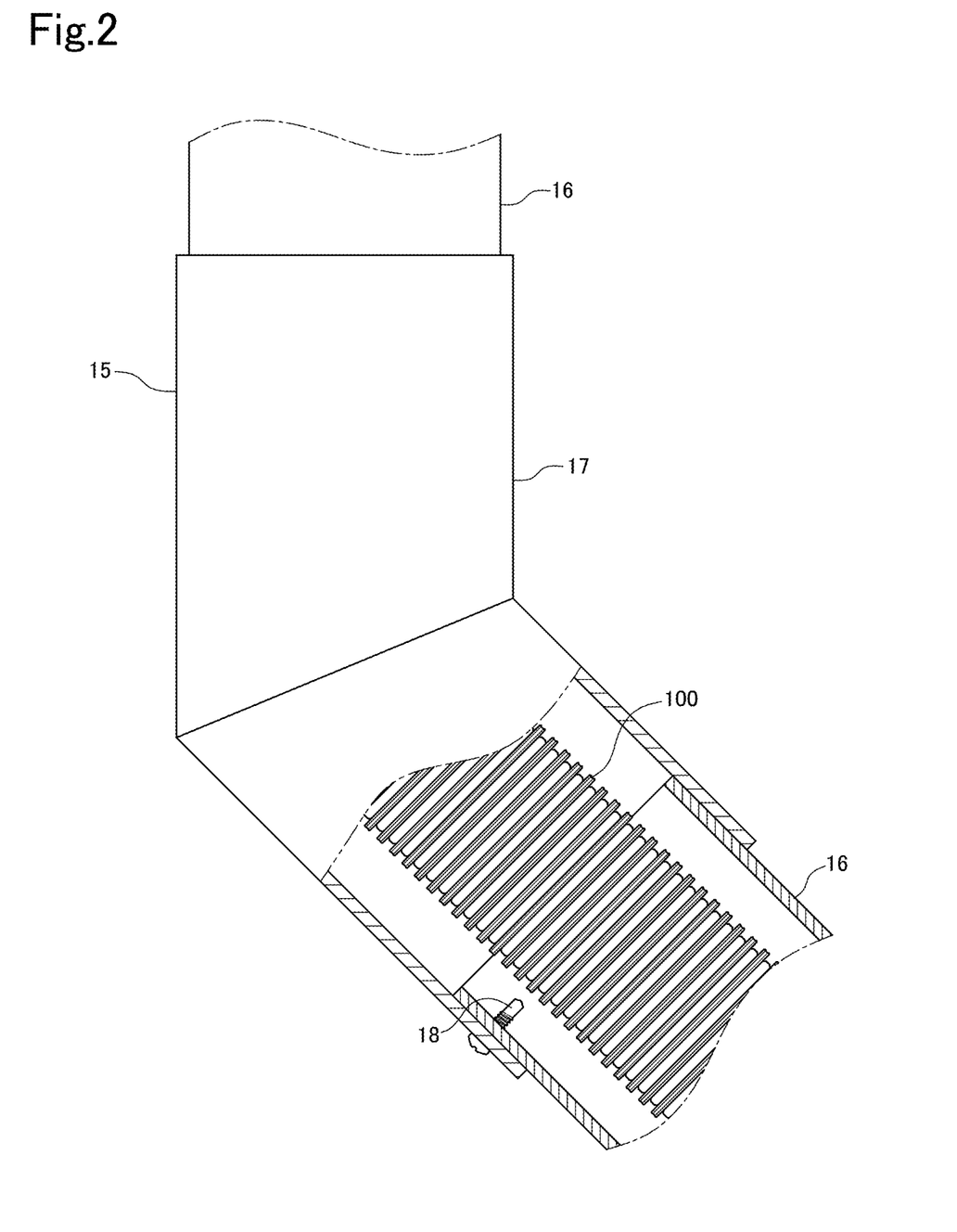
FIG. 2 is a partially enlarged view of the hot water supply system according to one embodiment of the present invention.

The conduit 100 is a flexible corrugated tube made of a synthetic resin, whereas the outer tube 15 is formed of a metallic hard cylindrical body. The outer tube 15 has a bent shape formed by joining a plurality of straight cylinders 16 via elbows 17. FIG. 2 is a partially enlarged view of a part in the vicinity of the elbow 17 of the hot water supply system 10. As shown in FIG. 2, one screw 18 is used to connect the long straight cylinder 16 to the elbow 17. In this system 10, the elbows 17 which are bent at 45 degrees are arranged at two places. The screw 18 is attached to the wall part not at the inner side, but at the outer side of the curve, in the lower portion of the respective elbows 17. This is because, in the hot water supply system 10 after installation, the conduit 100 moves to the inside of the curve more easily than to the outside of the curve. The screw 18 penetrates the outer wall of the straight cylinder 16 and the outer wall of the elbow 17 so that the head of the screw 18 is positioned at the outer side of the elbow 17 and that a sharp tip end of the screw 18 protrudes into the straight cylinder 16. In the constructed hot water supply system 10, the conduit 100 is provided in a bent state inside the outer tube 15 so as to avoid the screw 18, as shown in FIG. 2.

Figure 3:
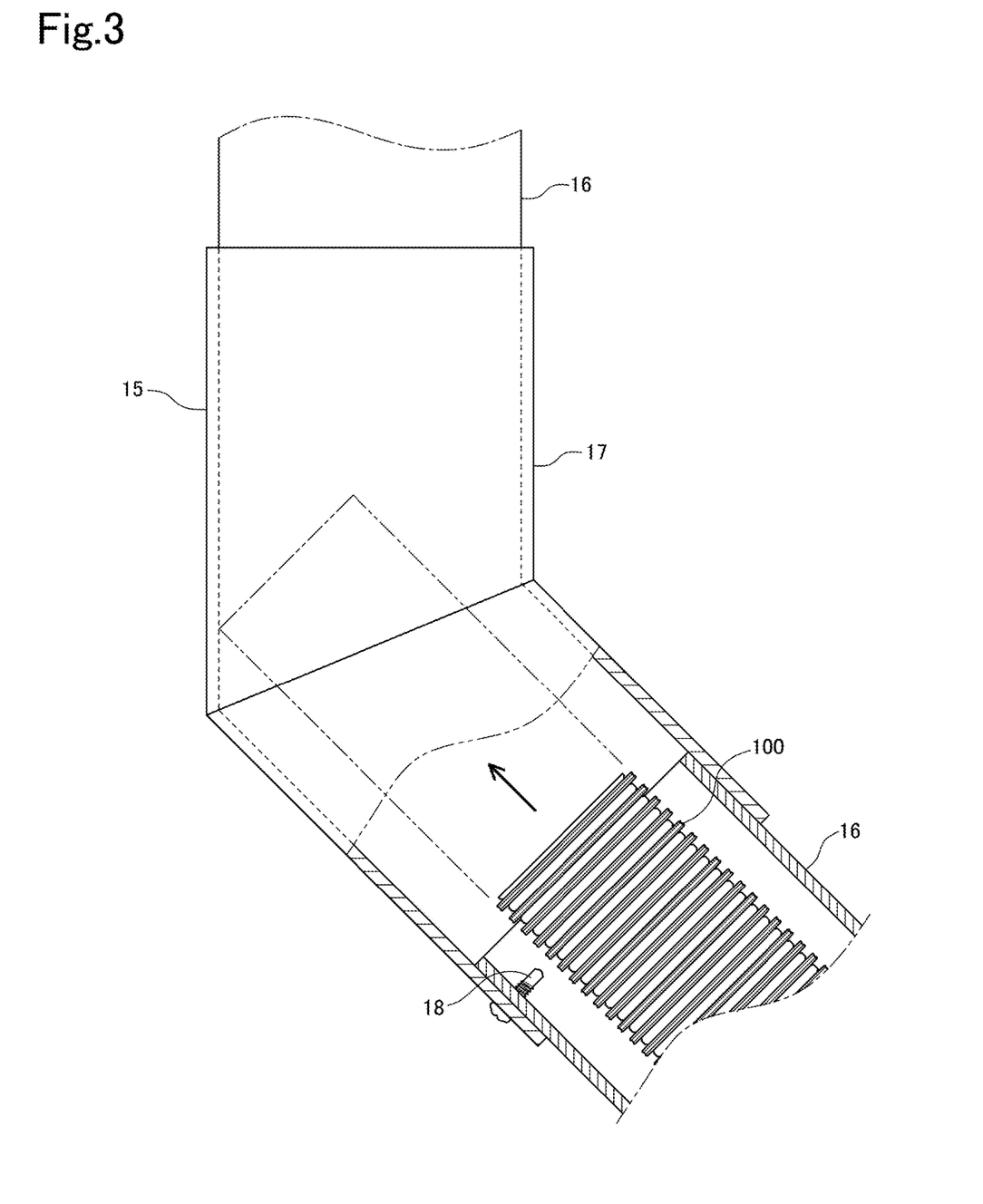
FIG. 3 is a schematic diagram showing the step of introducing a conduit into an outer tube in a method for constructing the hot water supply system according to one embodiment of the present invention.
Figure 4:
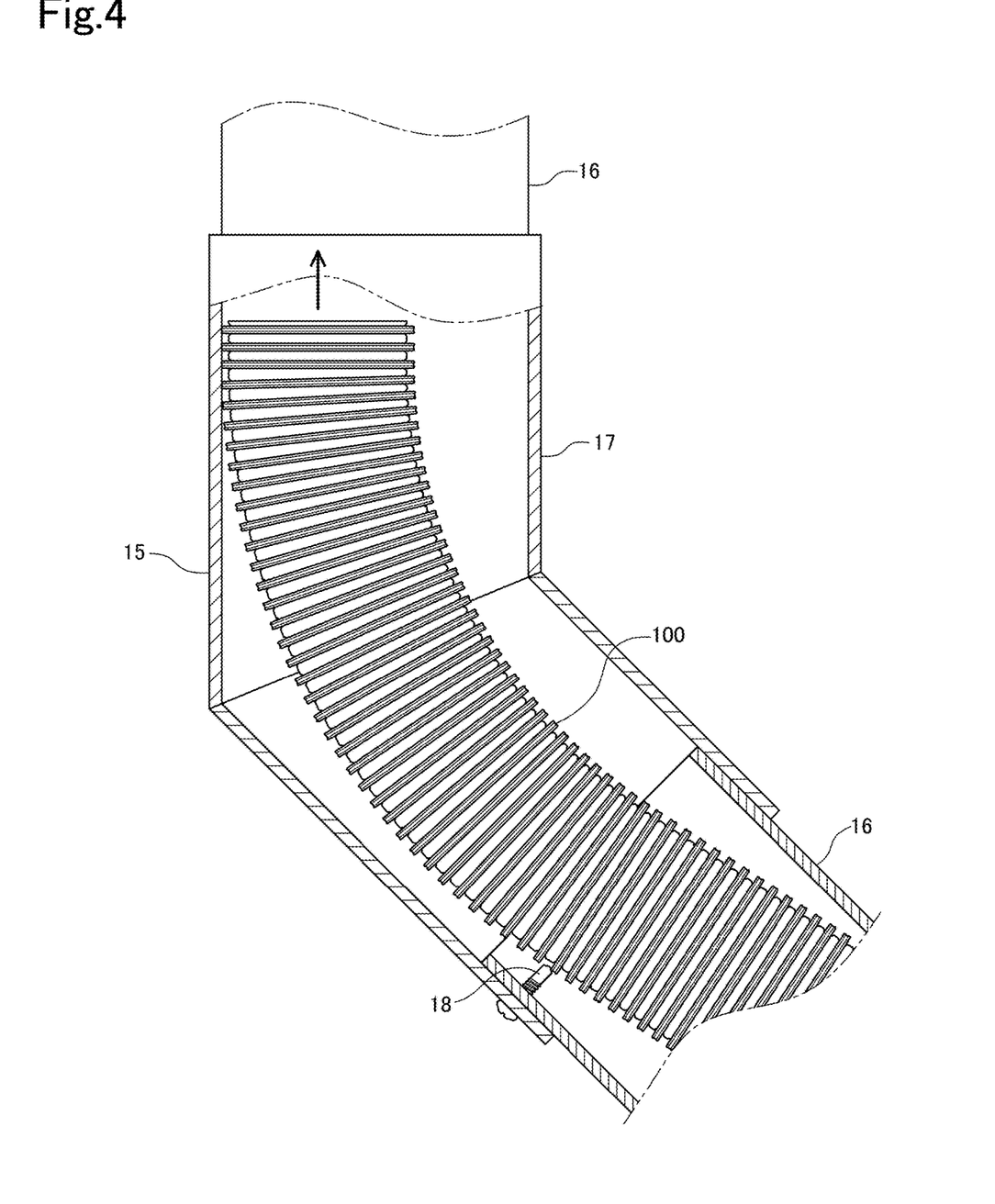
FIG. 4 is a schematic diagram showing the step of introducing the conduit into the outer tube in the method for constructing the hot water supply system according to one embodiment of the present invention.

The hot water supply system 10 is constructed by inserting the conduit 100 from an end part of the outer tube 15 and sending the conduit 100 into the outer tube 15. More specifically, as the conduit 100 is introduced and sent through an opening of the outer tube 15, the tip end of the conduit 100 advances inside the outer tube 15. In the straight cylinder 16, the conduit 100 advances linearly. Then, as shown in FIG. 3, the conduit 100 reaches the elbow 17, and the tip end of the conduit 100 abuts against the inclined surface of the elbow 17. When pushed further, the conduit 100 is bent along the inclined surface of the elbow 17. At this time, the conduit 100 is bent so as to bulge to the outside of the curve of the outer tube 15. As a result, the tip end of the screw 18 and the outer surface of the conduit 100 are brought into contact with each other, as shown in FIG. 4. Then, when the conduit 100 is sent in a state where the tip end of the screw 18 is in contact with the outer surface of the conduit 100, the outer surface of the conduit 100 is damaged. Especially, the corners of the convex portions of the conduit 100 are contacted with the tip end of the screw 18 and easily damaged.

The conduit 100 of the present invention is configured so that no hole is formed even if the outer surface is damaged when the tip end of the screw 18 scratches the outer surface. Also, the conduit 100 is configured so that the screw 18 would not be caught in the concave portion in the outer surface.

Figure 5:
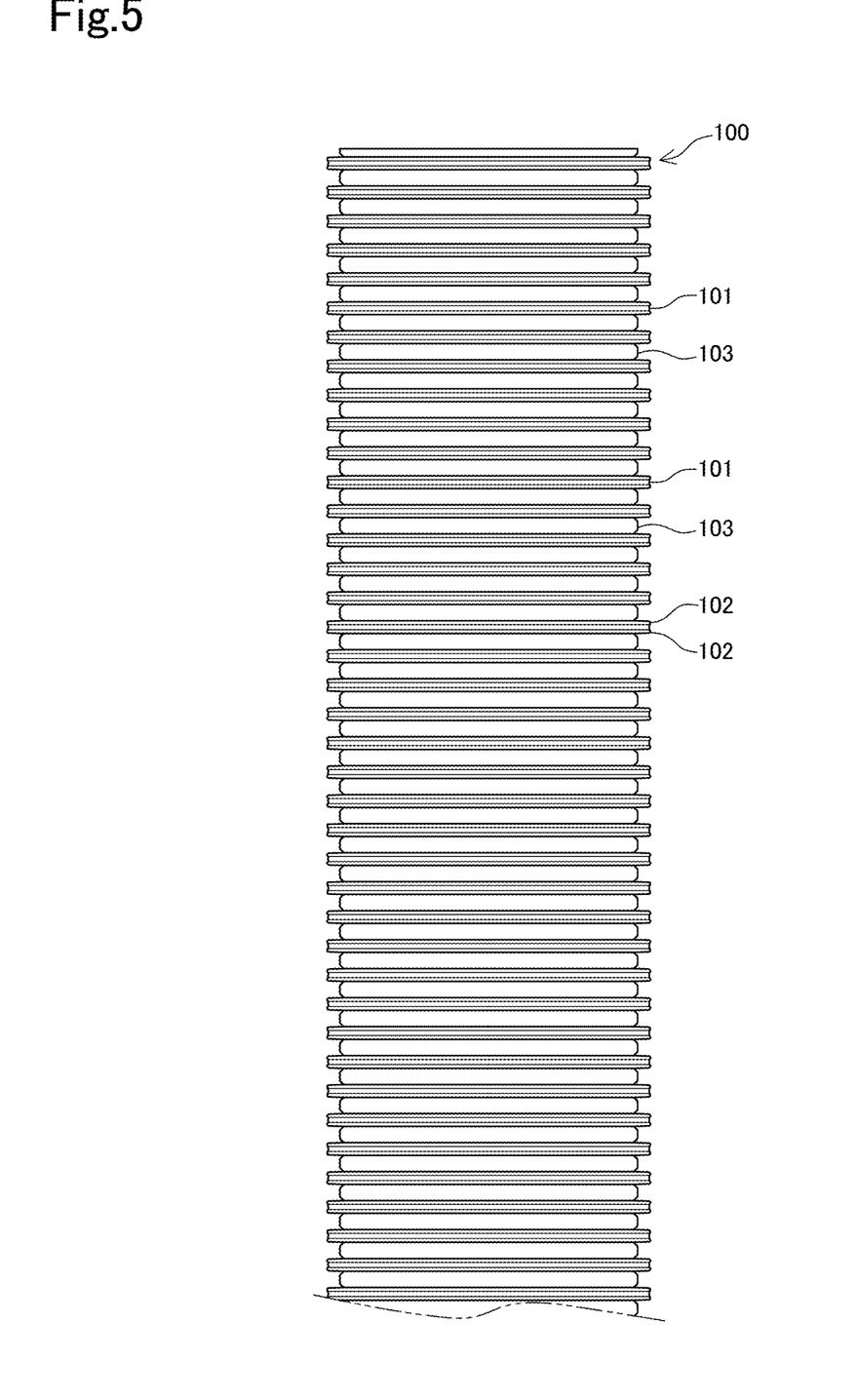
FIG. 5 is a side view of the conduit according to one embodiment of the present invention conduit.
Figure 6:
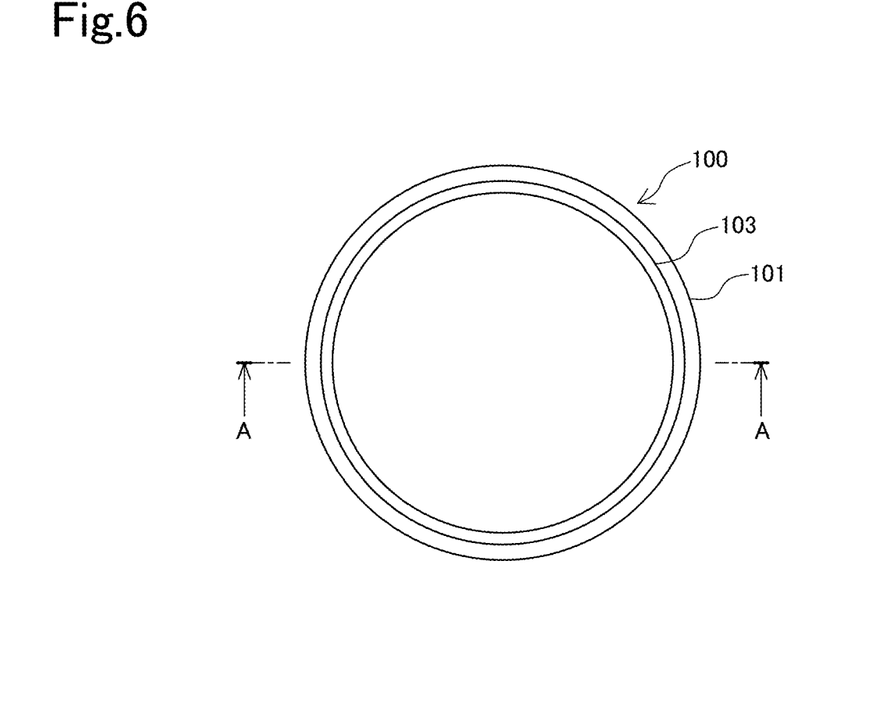
FIG. 6 is a front view of the conduit shown in FIG. 5.
Figure 7:
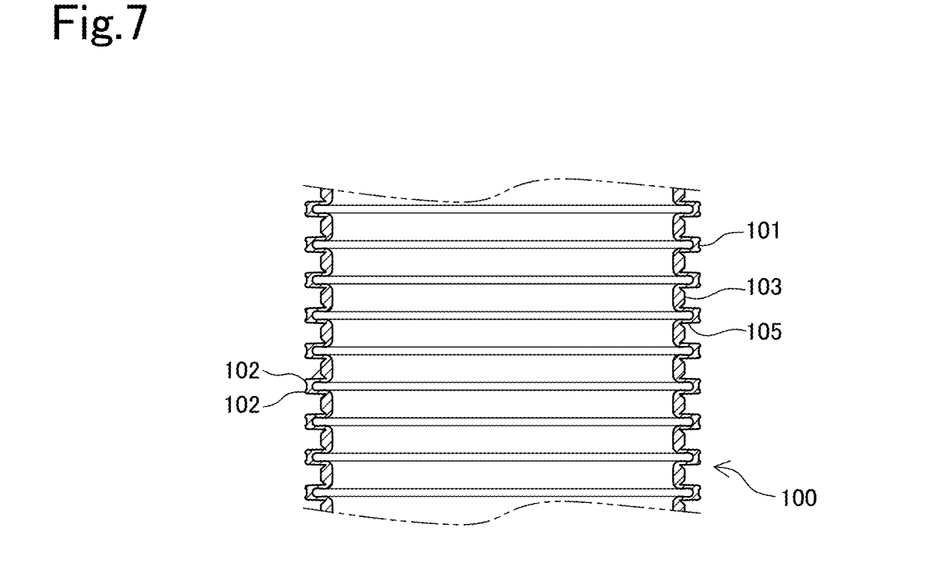
FIG. 7 is a sectional view taken along line A-A of FIG. 6.
Figure 8:
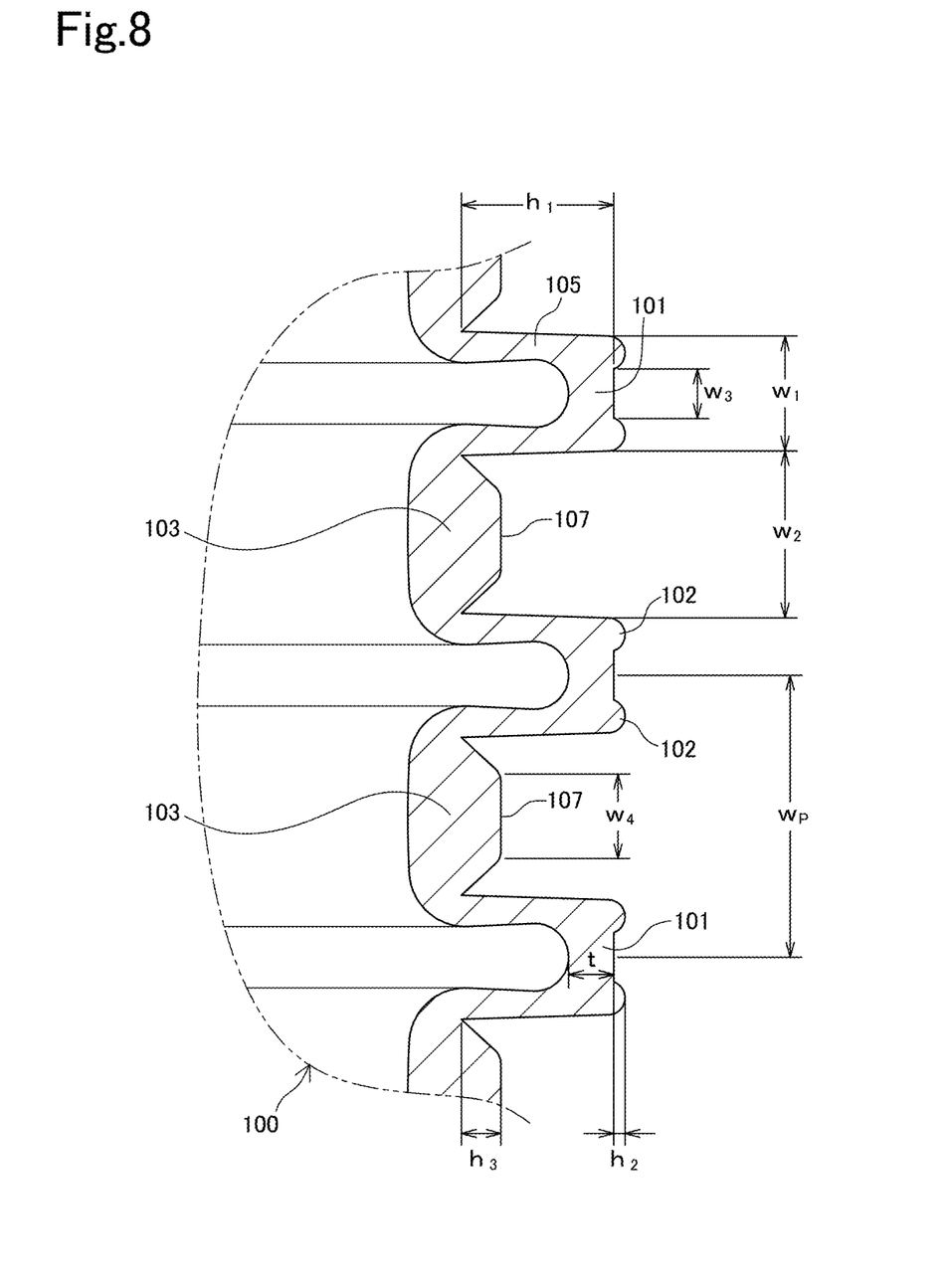
FIG. 8 is a partially enlarged view of the conduit shown in FIG. 7.

The configuration of the conduit 100 according to one embodiment of the present invention will now be described with reference to FIG. 5 to FIG. 8. FIG. 5 is a schematic side view of the conduit 100. FIG. 6 is a front view of the conduit 100. FIG. 7 is a sectional view of the conduit 100 taken along line A-A. FIG. 8 is a partially enlarged sectional view of the conduit 100.

The conduit 100 according to this embodiment is a long, bellows-shaped flexible tube made of a synthetic resin. The conduit 100 has a circular lateral section. The conduit 100 has an inner surface and an outer surface, and is configured so as to have concave portions and convex portions alternately and continuously provided in the length direction and to be bendable. The conduit 100 includes outer wall parts 101 constituting convex surfaces of the bellows and inner wall parts 103 constituting concave surfaces of the bellows. In a lateral sectional view, the outer wall part 101 is a ring-shaped body having a large diameter, and the inner wall part 103 is a ring-shaped body having a small diameter. An end part of the outer wall part 101 and an end part of the inner wall part 103 are joined by a side wall part 105 extending in the radial direction of the conduit 100. As a result, the outer wall parts 101 and the inner wall parts 103 are alternately and continuously provided and arranged between the side wall parts 105 in the length direction of the conduit. The conduit of this embodiment can be molded from a resin material such as (flame-retardant) polypropylene or (flame-retardant) polyethylene.

As shown in FIG. 8, the outer wall part 101 extends with a predetermined first width $w_1$ in the length direction. This first width $w_1$ is a width of the outer wall part 101 on the outer surface of the conduit 100. Also, the outer wall part 101 has a thickness t in the center. The inner wall part 103 is positioned radially inside relative to the outer wall part 101, and extends with a predetermined second width $w_2$ in the length direction. This second width $w_2$ is a width of the inner wall part 103 on the outer surface of the conduit 100. The second width $w_2$ is greater than the first width $w_1$. The side wall part 105 has a height $h_1$ from the outer surface of the inner wall part 103 to the outer surface of the outer wall part 101. The outer wall parts 101, inner wall parts 103 and side wall parts 105 are alternately and continuously provided at a pitch $w_p$ in the length direction.

A pair of protruding parts 102 are formed at both ends in the length direction on the outer surface of the outer wall part 101. The respective protruding parts 102 have a height $h_2$ from the outer surface of the outer wall part 101 to their apex. The pair of protruding parts 102 are spaced apart from each other with a third width $w_3$. In other words, a non-ridged part of the outer wall part 101 has a third width $w_3$. As a result, the outer wall part 101 has two edges that are relatively thick. Also, the edges of the respective protruding parts 102 are curved. The outer diameter D of the conduit 100 is defined as a diameter on the outer surfaces of the protruding parts 102 of the conduit 100.

A ridged part 107 is formed to be ridged on the outer surface of the inner wall part 103. The height $h_3$ of the ridged part 107 is smaller than the height $h_1$ of the side wall part 105. The ridged part 107 extends annularly along the outer periphery of the conduit 100. The ridged part 107 has a longitudinal section which has an approximately trapezoidal shape tapered radially outward, as shown in FIG. 8. The approximately trapezoidal ridged part 107 includes an upper bottom part positioned on the outer side of the inner wall part 103 and a lower bottom part integrally coupled to the inner wall part 103. The distance between the lower bottom part and the upper bottom part corresponds to the height $h_3$ of the ridged part 107. The upper bottom part has a width $w_4$ in the length direction. In this embodiment, the width $w_4$ of the upper bottom part is about ½ to ⅔ of the second width $w_2$ of the inner wall part 103. Both side ends of the lower bottom part of the ridged part 107 are positioned at both ends of the outer surface of the inner wall part 103. Briefly, the width of the lower bottom part of the ridged part 107 is equal to the second width $w_2$ of the inner wall part 103, in FIG. 8. Also, the outer surface of the conduit 100 gradually changes. The inclined surface of the ridged part 107 is formed adjacent to both of the side wall parts 105 on the outer surface of the inner wall part 103, and a flat surface is formed approximately in the center. A V-shaped or wedge-shaped gap is formed between the ridged part 107 and the side wall part 105.

The outer surface of the conduit 100 is relatively linearly formed, whereas the inner surface of the conduit 100 is slightly rounded as compared with the outer surface. In other words, the inner surface of the inner wall part 103 defines a moderately-curved convex curve surface. This is due to the molding process (such as vacuum molding) of the conduit 100. In this embodiment, design has been made so that the ridged part 107 is provided on the outer surface of the inner wall part 103, thereby relatively suppressing inward bulging of the inner surface of the inner wall part 103. A near-flat inner surface profile of the inner wall part 103 imparts a smoother appearance to the entire inner surface of a hose, and contributes to the reduction in air resistance inside the hose. As a result, the pressure loss in the exhaust gas is alleviated.

While the inner wall part 103 is formed thick as a whole, the thinnest portions are located at both ends of the inner wall part 103 (or the ridged part 107). The inner surface of the side wall part 105 is inclined so that the distance between the inner surfaces of the side wall parts 105 which face each other across the outer wall part 101 becomes narrower toward the radial inside of the conduit 100. In short, the side wall part 105 is thin on the side of the outer wall part 101 and is thick on the side of the inner wall part 103.

When the conduit 100 is bent, the thinnest portions at both ends of the inner wall part 103 and the thinnest portion at the outer side of the side wall part 105 are easily bowed and deformed. By contrast, the relatively thick outer wall part 101 and inner wall part 103 are hard to bend. Thus, when the conduit 100 is bent, the thin portions are bent preferentially, thereby suppressing the bending of the inner wall part 103 itself.

In the dimensions of the conduit 100 according to this embodiment, $(h_1-t)$ affects the flexibility of the conduit 100. In order to ensure appropriate flexibility, $(h_1-t)$ is preferably 45% or less of the pitch $w_P$. Alternatively, supposing that the inward protrusion amount of the screw 18 from the outer tube 15 is 10 mm, $(h_1-t)$ is preferably about 1.8 mm or more and about 2.2 mm or less. Also, $(h_1+h_2-h_3)$ affects the easiness for the screw 18 to bite into the concave portion of the conduit 100. Preferably, $(h_1+h_2-h_3)$ is 46% or less of the pitch $w_P$ in order to prevent the screw 18 from being caught in the concave portion. Alternatively, supposing that the inward protrusion amount of the screw 18 from the outer tube 15 is 10 mm, $(h_1+h_2-h_3)$ is preferably about 2.3 mm or less. However, $(h_1+h_2-h_3)$ is preferably about 2.0 mm or more in view of the effects on the flexibility. Then, $h_2$ affects the durability of the conduit 100 when the conduit 100 is rubbed with the screw 18. Supposing that the inward protrusion amount of the screw 18 from the outer tube 15 is about 10 mm, $h_2$ is preferably 0.1 mm or more in order to reduce the possibility that a hole would be formed in the outer surface of the conduit 100. However, in view of the effects on the handleability of the conduit 100 due to increase in outer diameter of the conduit 100 or due to protrusion of the protruding parts 102, $h_2$ is preferably about 0.6 mm or less, more preferably about 0.4 mm or less.

Next, an Example of the conduit 100 will be described. The conduit 100 of the Example was produced through a common vacuum molding process. In the vacuum molding process, a sheet-shaped resin material softened by heating was arranged around a die, and a space between the material and the die was vacuumed, so that the material was closely adhered to the die. As a result, a conduit made of a synthetic resin was molded.

The conduit 100 of the Example has, for example, the following dimensions.

$w_1$=2.2 mm $w_2$=2.8 mm $w_3$=0.9 mm $w_4$=1.3 mm $w_P$=5.0 mm $h_1$=2.7 mm $h_2$=0.2 mm $h_3$=0.7 mm t=0.8 mm

D=56.4 mm

The conduit 100 was designed on the supposition that the protrusion amount of the screw 18 was about 10 mm. In this Example, the conduit satisfies the following requirements.

$$h_1 - t = 1.9 \text{ mm} < 2.2 \text{ mm}$$

$$h_1 + h_2 - h_3 = 2.2 \text{ mm} < 2.3 \text{ mm}$$

$$h_2 = 0.2 \text{ mm} > 0.1 \text{ mm}$$

The conduit 100 of the Example was subjected to a test on the resistance to scratching by a screw. The test was conducted by introducing the conduit 100 into the outer tube 15, which is bent. Specifically, the conduit 100 was pushed into the outer tube 15 laid as shown in FIGS. 1 and 2 (the outer tube 15 has elbows 17 bent at 45° and provided at two places and has two screws 18) with relatively strong force (0.36 kg/m) in a straight advancing direction, and then the appearance of the conduit 100 was observed. The protrusion amount of the screw 18 on the inner surface of the outer tube 15 was 10 mm. Also, the outer tube 15 had an inner diameter of 76.2 mm (3 inches). As a Comparative Example, a conduit having no protruding part was used. The conduit of the Comparative Example is identical with the conduit of the Example in dimensions and shape except that the former has no protruding part.

Figure 9:
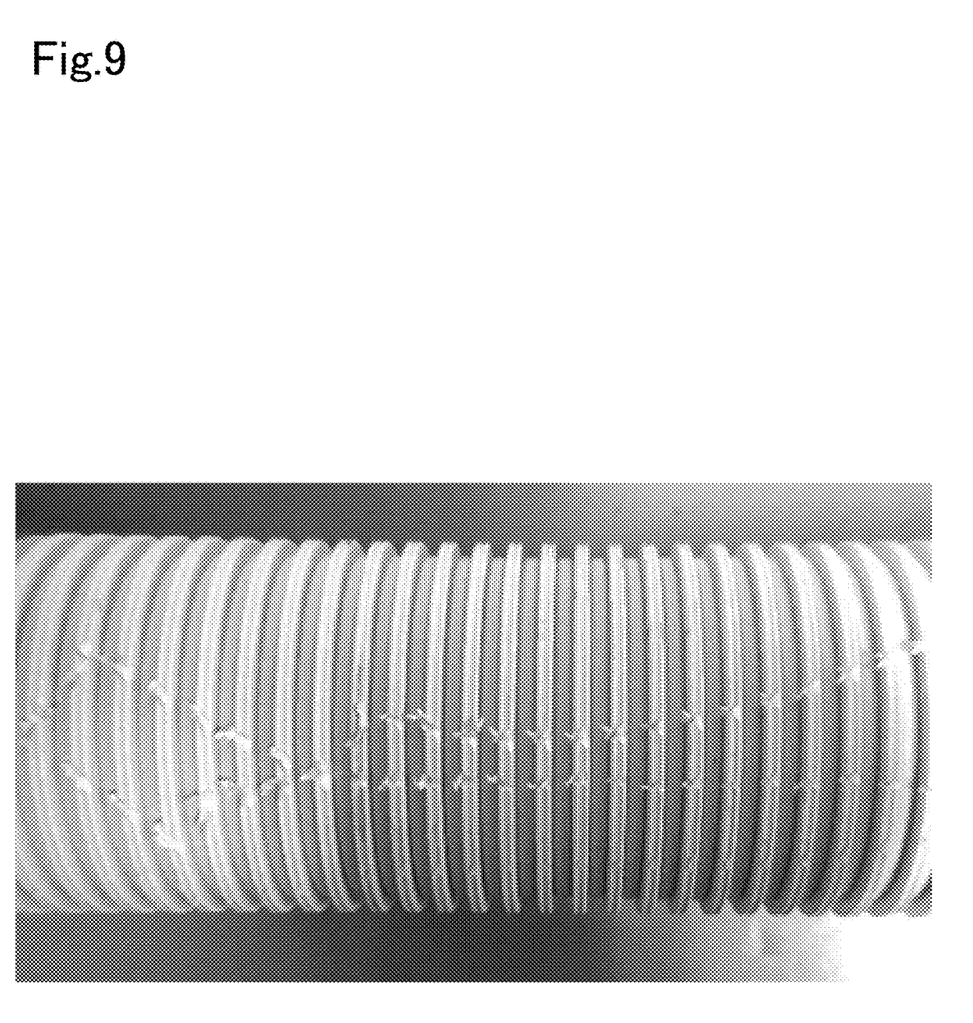
FIG. 9 is a black and white photograph showing test results for introducing an exemplary conduit according to one embodiment of the present invention into an outer tube.
Figure 10:
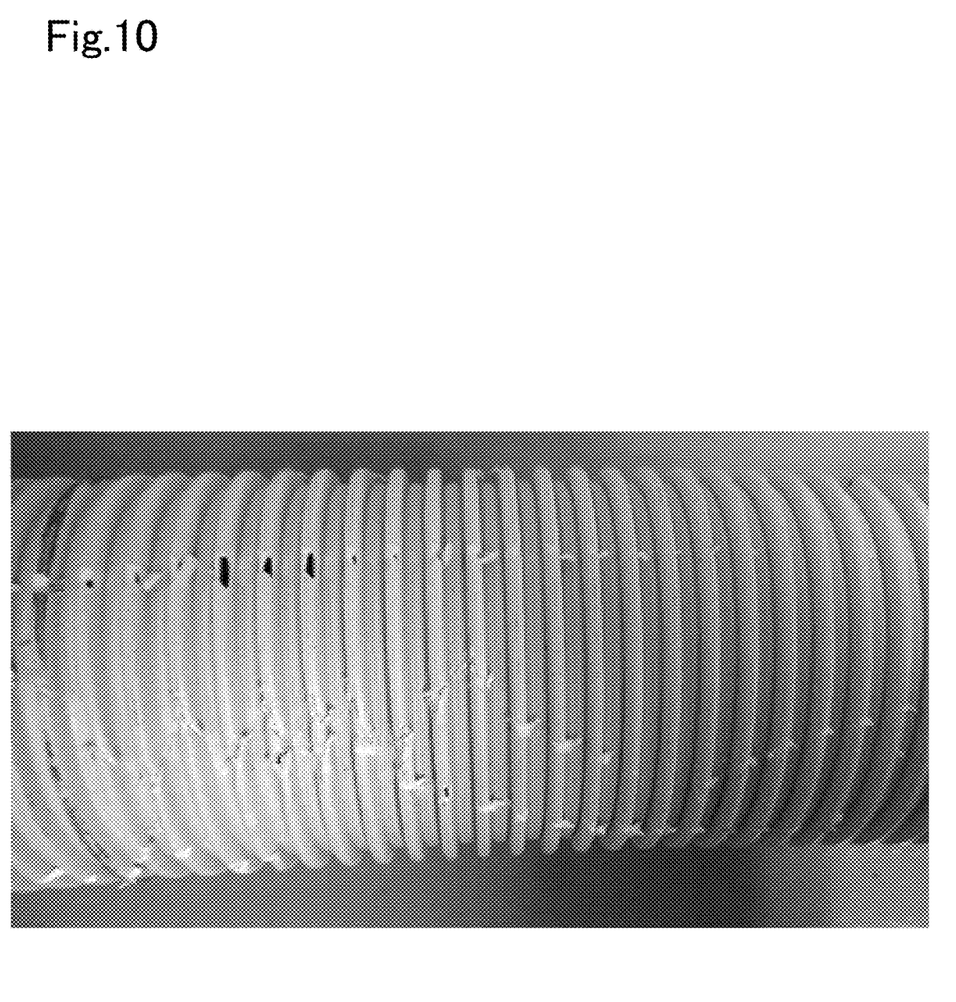
FIG. 10 is another black and white photograph showing test results for introducing a conduit of a Comparative Example into an outer tube.

FIG. 9 is a photograph showing the appearance of the conduit 100 of the Example after testing. It is seen that no hole is formed although the convex portions of the conduit 100 are damaged, as shown in FIG. 9. FIG. 10 is a photograph showing the conduit of the Comparative Example. As shown in FIG. 10, the outer surface of the conduit is damaged, while a plurality of holes are formed in some of the damaged parts. A similar test was repeated many times, and similar results were obtained.

The conduit of the present invention thus has the advantage of making it difficult for a hole to be formed when the outer surface is scratched by a screw. As a result, the present invention provides a conduit having high resistance to scratching by a screw.

The present invention is not limited to the above embodiment, and can take various embodiments and variants.

The conduit of the present invention is not limited to the above application, and those skilled in the art can use the conduit in various applications. For example, the conduit of the present invention may be used in applications including piping for air ventilation and piping of air conditioners.

The conduit of the present invention is not limited to the shape and dimensions of the above embodiment. In other words, the shape and dimensions of the Example are indicated for purposes of illustration, and those skilled in the art can arbitrarily change the shape and dimensions without departing from the technical scope of the present invention. For example, the conduit may have an elliptic, oval or polygonal lateral sectional shape.

Although the disclosure has been presented with reference only to the presently preferred embodiments, it should be understood that various modifications can be made without departing from the spirit and scope of the present invention. Accordingly, the patent protection accorded to the present invention is limited only by the following claims.

What is claimed is:

1. A bendable conduit made of a synthetic resin, having an inner surface and an outer surface, having concave parts and convex parts alternately and continuously provided in the length direction, the conduit comprising:

outer wall parts having inner surfaces and outer surfaces, the outer surfaces extending with a first width $w_1$ in the length direction;

inner wall parts having inner surfaces and outer surfaces, the outer surfaces positioned radially inside relative to the inner surfaces of the outer wall parts and the outer surfaces extending with a second width $w_2$ in the length direction; and side wall parts having inner surfaces and outer surfaces, the outer surfaces extending in the radial direction with a height $h_1$ and continuously joining ends in the length direction of the outer surfaces of the outer wall parts and ends in the length direction of the outer surface of the inner wall parts so that the outer wall parts and the inner wall parts are alternately and continuously provided in the length direction of the bendable conduit, wherein the outer wall parts each have, at both ends in the length direction, protruding parts which protrude from the outer surface in the radial direction.

2. The conduit according to claim 1, wherein the inner wall parts each have a ridged part that protrudes in the radial direction between both ends in the length direction of the outer surface of the inner wall part.

3. The conduit according to claim 2, wherein the ridged part has a longitudinal section formed in a trapezoidal shape that is tapered radially outward.

4. The conduit according to claim 2, wherein the ridged part is formed adjacent to the outer surfaces of the side wall parts.

5. The conduit according to claim 1, wherein the second width is greater than the first width.

6. The conduit according to claim 1, wherein t represents a thickness in the center of the outer wall part, and $(h_1-t)$ is about 2.2 mm or less.

7. The conduit according to claim 2, wherein $h_2$ represents a height of the protruding part, $h_3$ represents a height of the ridged part; and $(h_1+h_2-h_3)$ is about 2.3 mm or less.

8. The conduit according to claim 1, wherein the height $h_2$ of the protruding part is 0.1 mm or more.

9. A hot water supply system comprising:

a water heater installed inside a building and having an exhaust port;

an air diffusion part formed on a wall or roof of the building;

an outer tube laid between the water heater and the air diffusion part; and a bendable conduit made of a synthetic resin laid inside the outer tube and connecting the exhaust port and the air diffusion part, the conduit having an inner surface and an outer surface, having concave parts and convex parts alternately and continuously provided in the length direction, the conduit comprising:

outer wall parts having inner surfaces and outer surfaces, the outer surfaces extending with a first width $w_1$ in the length direction;

inner wall parts having inner surfaces and outer surfaces, the outer surfaces positioned radially inside relative to the inner surfaces of the outer wall parts and the outer surfaces extending with a second width $w_2$ in the length direction; and side wall parts having inner surfaces and outer surfaces, the outer surfaces extending in the radial direction with a height $h_1$ and continuously joining ends in the length direction of the outer surfaces of the outer wall parts and ends in the length direction of the outer surface of the inner wall parts so that the outer wall parts and the inner wall parts are alternately and continuously provided in the length direction,
wherein the outer wall parts each have, at both ends in the length direction, protruding parts which protrude from the outer surface in the radial direction.

* * * * *